(12) United States Patent
Blackmore et al.

(10) Patent No.: US 7,689,992 B2
(45) Date of Patent: Mar. 30, 2010

(54) SHARING LOCK MECHANISM BETWEEN PROTOCOL LAYERS

(75) Inventors: Robert S. Blackmore, Poughkeepsie, NY (US); Su-Hsuan Huang, Fishkill, NY (US); Chulho Kim, Poughkeepsie, NY (US); Richard R. Treumann, Highland, NY (US); Hanhong Xue, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1392 days.

(21) Appl. No.: 10/877,095

(22) Filed: Jun. 25, 2004

(65) Prior Publication Data

US 2005/0289550 A1  Dec. 29, 2005

(51) Int. Cl.
*G06F 9/46* (2006.01)
(52) U.S. Cl. ..................................................... 718/102
(58) Field of Classification Search ................... 718/102
See application file for complete search history.

(56) References Cited

U.S. PATENT DOCUMENTS 6,199,094 B1 * 3/2001 Presler-Marshall .......... 718/104
6,449,614 B1   9/2002 Marcotte ....................... 707/8

OTHER PUBLICATIONS

Experiences Implementing a High-Performance TCP in User-Space Edwards et al. University of Cambridge Sep. 1995.*

* cited by examiner

*Primary Examiner*—Meng-Ai An
*Assistant Examiner*—Mengyao Zhe
(74) *Attorney, Agent, or Firm*—Matthew W. Baca; Amy J. Pattillo

(57) ABSTRACT

Shared locks are employed for controlling a thread which extends across more than one protocol layer in a data processing system. The use of a counter is used as part of a data structure which makes it possible to implement shared locks across multiple layers. The use of shared locks avoids the processing overhead usually associated with lock acquisition and release. The thread which is controlled may be initiated in either an upper layer protocol or in a lower layer.

9 Claims, 6 Drawing Sheets

SHARING LOCK MECHANISM BETWEEN PROTOCOL LAYERS

BACKGROUND OF THE INVENTION

The present invention is generally directed to the control of process threads in a data processing system. More particularly, the present invention is directed to the control of process threads that extend across protocol layers. Even more particularly, the present invention is directed to the use of locking mechanisms which have low impact on system performance but which still provide safe thread and data handling.

As used herein, a "mutual exclusion lock," or just "lock" for short, is a synchronization service which is employed in data processing systems and which is used to ensure exclusive access to data shared between threads so that shared data is always seen by the threads in a consistent state.

Protocol layering is a common approach to building complex communication protocols. However, the resulting layer structure is also criticized for its performance overhead. One of the typical overhead "hits" incurred in thread-safe protocol layering is double locking. This means that lock mechanisms are invoked in multiple layers for a single thread. There is no coordination of locking between layers. Yet locking mechanisms are still required for process and data integrity.

Solely for the purposes of clarity and consistency in the present description, in the protocol layering discussions herein, the protocol above is defined to be the upper layer protocol (ULP) and the protocol below is defined to be the lower layer protocol. Both the upper and the lower layer protocols use locking to guarantee thread safety. A user's call to the upper layer protocol's Application Program Interface (API) typically results in the following exemplary down-call sequence.

The upper layer protocol:
1. Acquire ULP lock
2. Request/Event/Data preprocessing
3. Release ULP lock
4. Call to the lower layer protocol's API
The lower layer protocol:
4.1 Acquire LLP lock
4.2 Request/Event/Data processing
4.3 Release LLP lock
4.4 Return to the upper layer protocol
The upper layer protocol:
5. Reacquire ULP lock
6. Request/Event/Data postprocessing
7. Release ULP lock
8. Return to the user Also, the lower layer protocol can handle synchronous/asynchronous events and generates callbacks to the upper layer protocol, resulting in the following exemplary up-call sequence.

The lower layer protocol:
1. Acquire LLP lock
2. Event preprocessing
3. Release LLP lock
4. Callback to the upper layer protocol
The upper layer protocol:
4.1. Acquire ULP lock to protect the upper layer protocol's data structure
4.2. Event processing
4.3. Release ULP lock before returning to the lower layer protocol
4.4. Return to the lower layer protocol The lower layer protocol:
5. Reacquire LLP lock
6. Event postprocessing
7. Release LLP lock
8. End of event handling It is also pointed out that up-call sequences and down-call sequences may be embedded in each other, depending on whether the layering allows it or not. Clearly, both sequences (threads or thread portions) acquire and/or release two locks. This is a very expensive operation in terms of the utilization of system time and resources. On some systems it is worse than others but often depends on the application itself. It also can be argued that Steps 3 and 5 in the two scenarios shown above are not necessary because there is no circular dependency (for example, with an up-call holding lock B and waiting for lock A while a down-call is holding lock A and is waiting for lock B). In this situation there is no deadlock situation.

SUMMARY OF THE INVENTION

In accordance with a preferred embodiment of the present invention double locking is removed by sharing a single lock between an upper protocol layer and a lower protocol layer, so that the two protocols are thus more tightly coupled in terms of locking. The shared lock is defined either in the lower protocol and then exposed to the upper protocol, or defined in the upper protocol and then exposed to the lower protocol. From another perspective the present invention comprises a method for controlling a thread in a data processing system in which the thread extends across at least two protocol layers. This method includes the steps of: acquiring a lock visible to at least two protocol layers; determining, in one of these layers, a status for the lock; and releasing the lock.

Because extra locking is removed, communication latency is improved and bandwidth for a small or medium sized message (messages less than about 1 megabyte) is also improved. In multithreaded applications, it was thought that the throughput would degrade since locking granularity in the shared lock case is coarser than in the separate lock case. However, multithreaded performance with lock sharing is overwhelmingly better than without lock sharing.

Accordingly, it is an object of the present invention to provide an improved locking mechanism for threads which extend across protocols.

It is also an object of the present invention to reduce overhead in locking operations.

It is yet another object of the present invention to reduce the number of locking operations used in a single threaded process.

It is a still further object of the present invention to foster the use of process threads which extend across protocol layers and to thus make it easier to use multiple protocol layers, the use of which is desirable for programming clarity, functionality, maintainability and for simplifying complex tasks.

Lastly, but not limited hereto, it is an object of the present invention to enhance data safety and integrity.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawing in which:

DETAILED DESCRIPTION OF THE INVENTION

Figure 1:
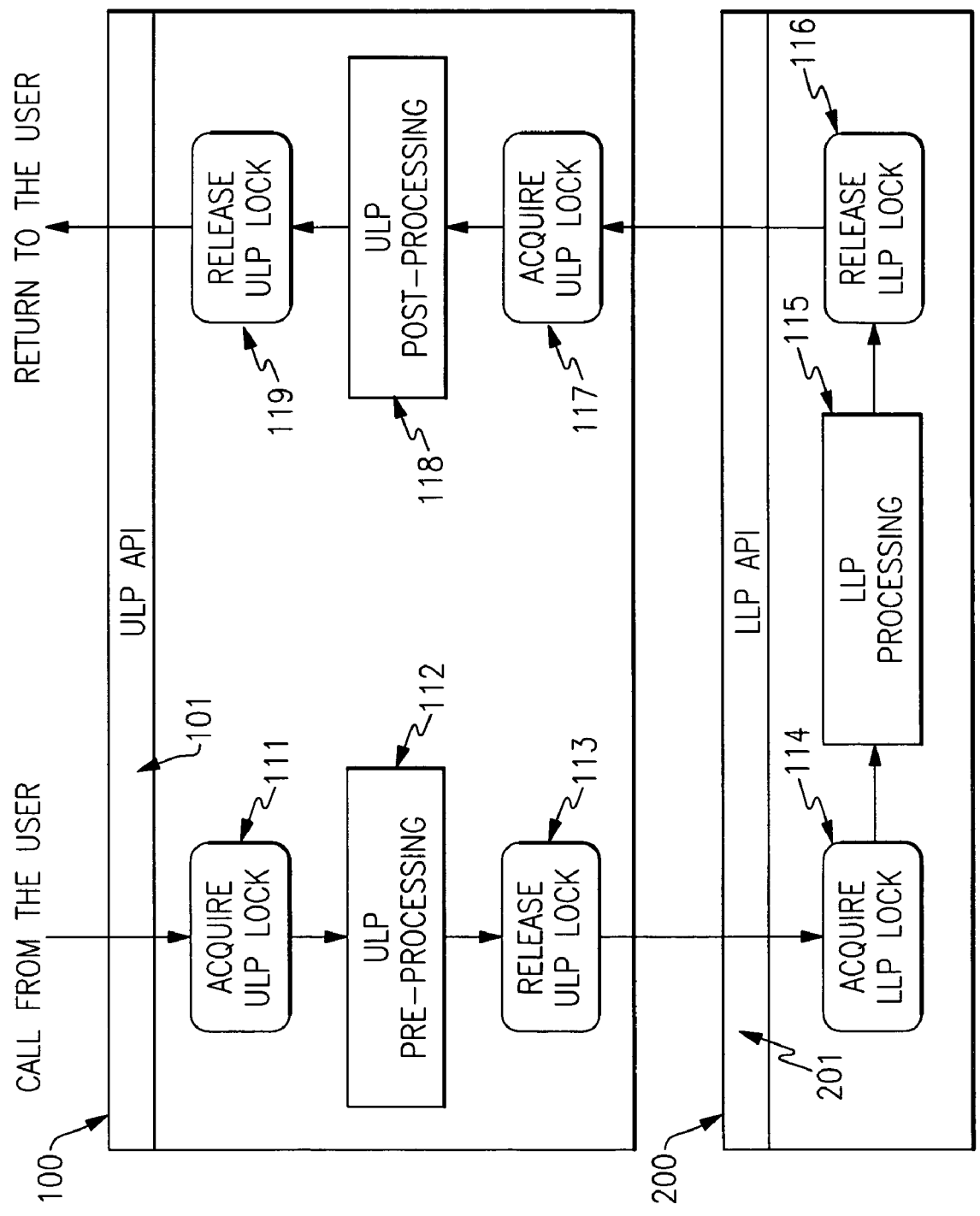
FIG. 1 is a functional block diagram illustrating a thread which spans more than one protocol layer.
Figure 2:
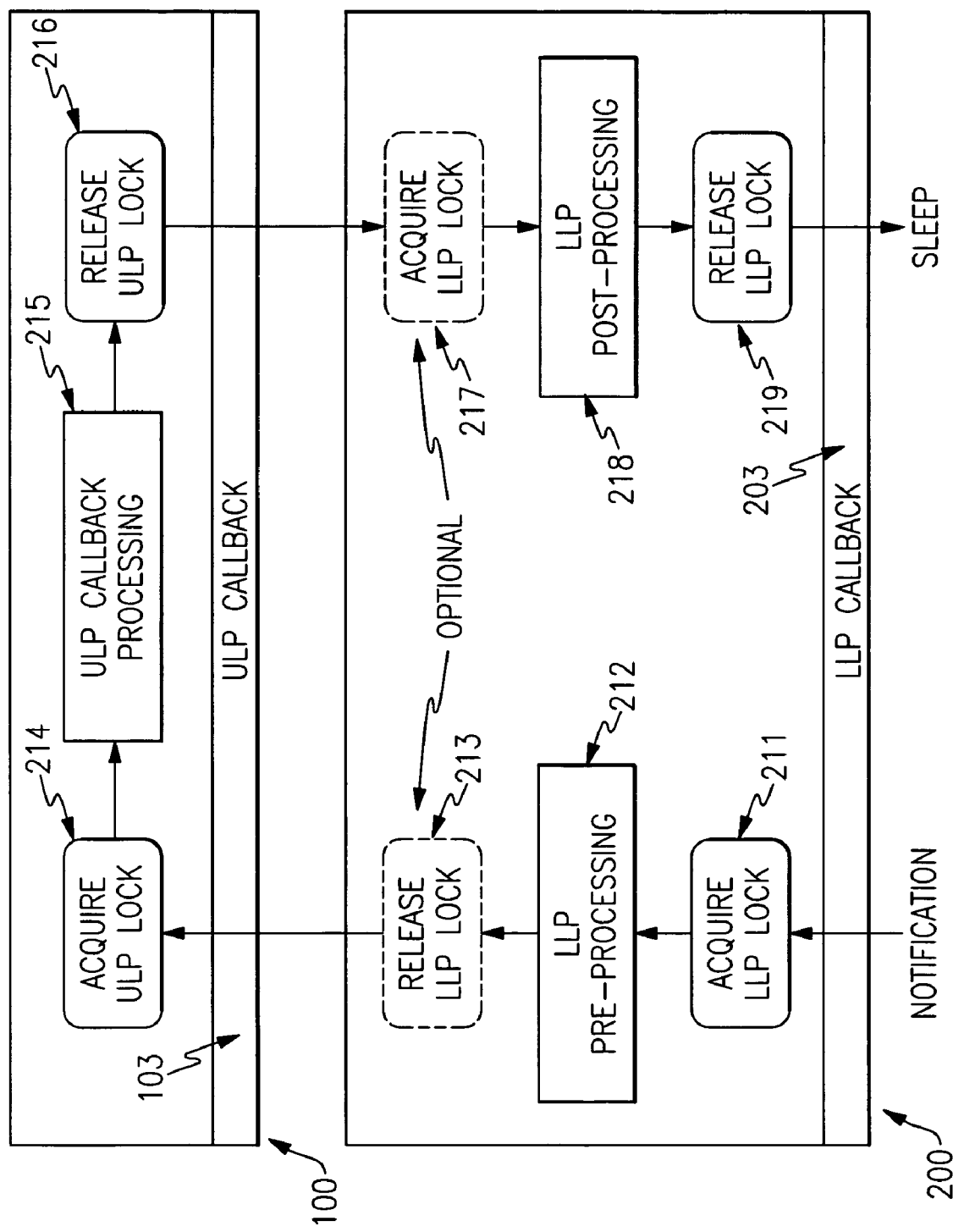
FIG. 2 is a functional block diagram illustrating similar to FIG. 1 but more particularly illustrating the situation in which the thread follows a notification-sleep sequence rather than a call-return sequence as seen in FIG. 1.
Figure 3:
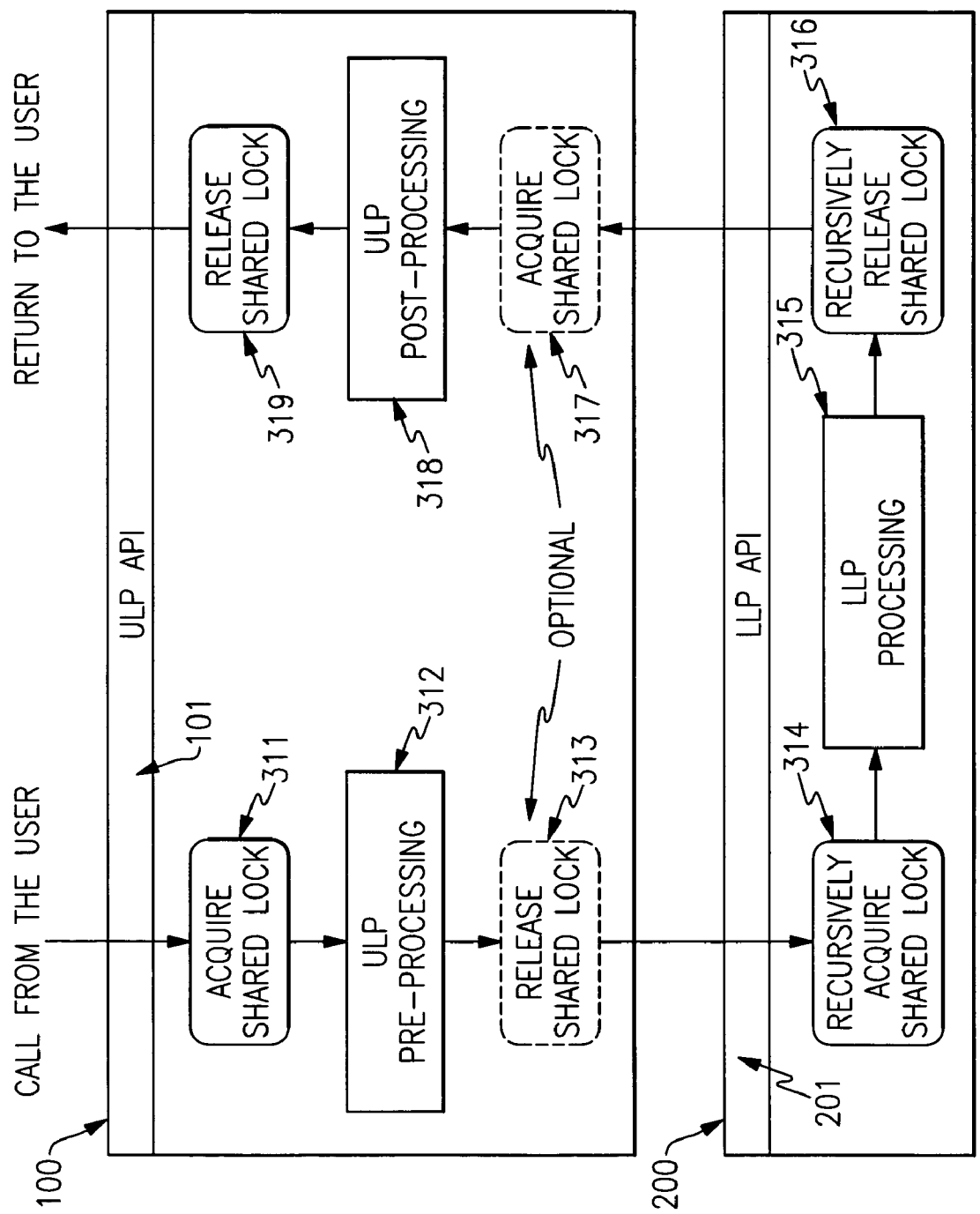
FIG. 3 is a functional block diagram similar to FIG. 1 but more particularly illustrating the use of a shared lock across protocol layers.
Figure 4:
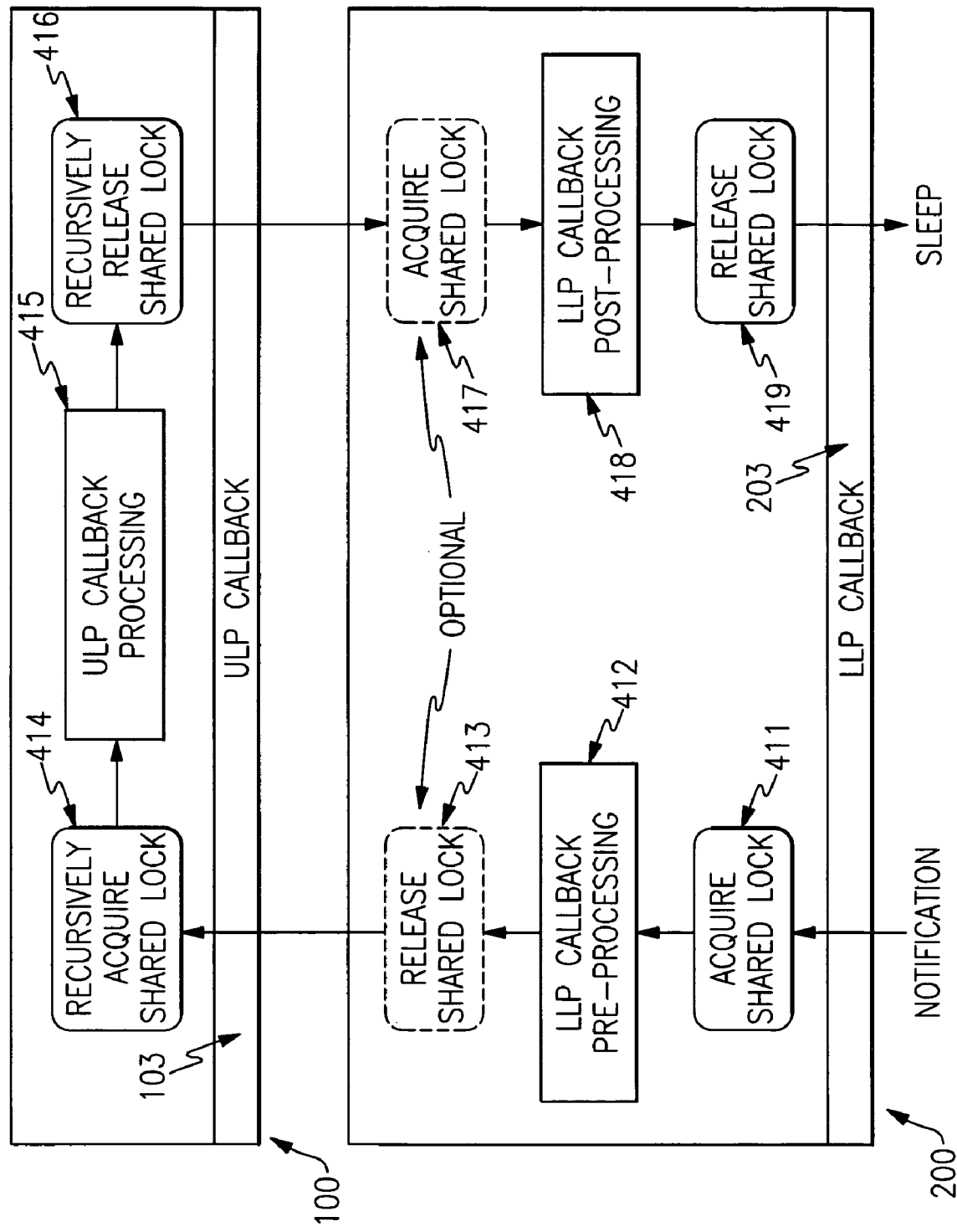
FIG. 4 is a functional block diagram similar to FIG. 2 but more particularly illustrating the use of a shared lock across protocol layers, as first shown in FIG. 3.
Figure 5:
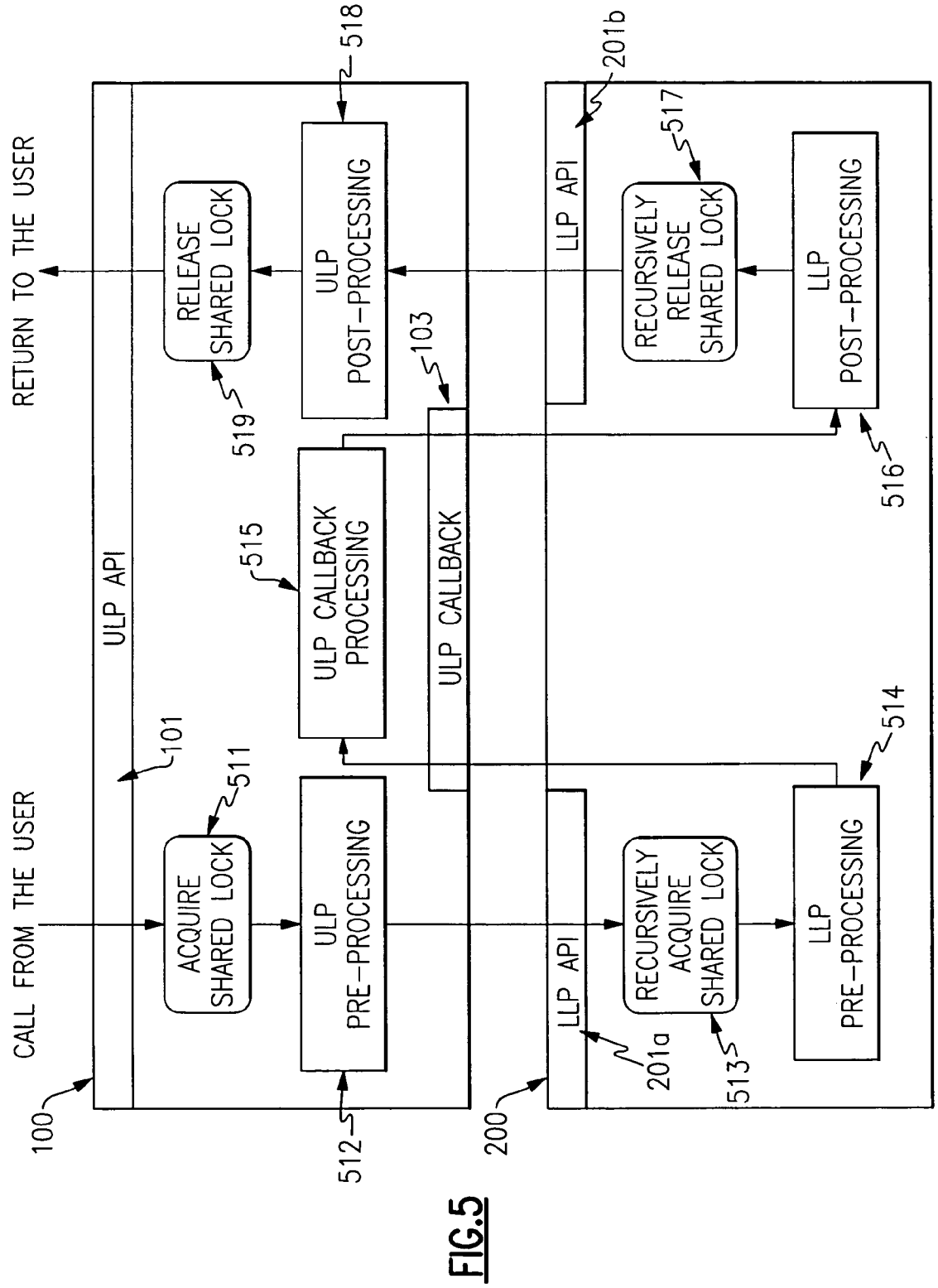
FIG. 5 is a functional block diagram similar to FIG. 3 but more particularly illustrating the thread scenario in which there is an intermediate return to the upper protocol layer.
Figure 6:
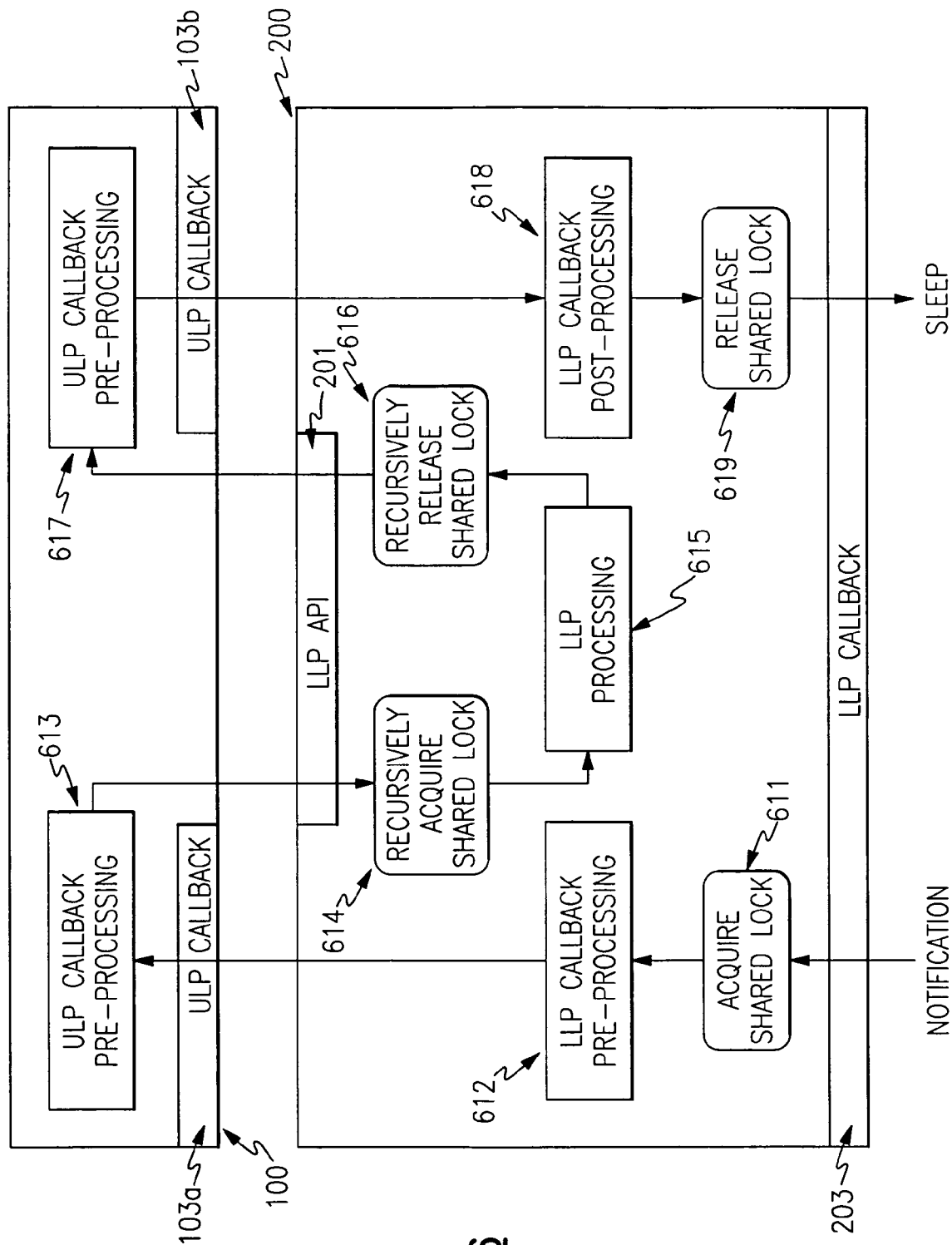
FIG. 6 is a functional block diagram similar to FIG. 4 but more particularly illustrating the thread scenario in which there is an intermediate return to the lower protocol layer.

The present invention is best illustrated in FIGS. 3 through 6. However, the environment in which the present invention operates and the problems which it addresses are more particularly illustrated in FIGS. 1 and 2. Nonetheless, in all of the figures there is a common nomenclature running through them in the form of upper layer (or, synonymously, level) 100. Also included in all of the figures is lower level (or layer) 200. In addition, each of the figures includes a single processing thread. In FIG. 1 this thread is indicated with sequentially numbered blocks beginning with block 111. In FIG. 2 this thread begins with block 211. And so on, for FIGS. 3, 4, 5 and 6 having threads beginning with blocks 311, 411, 511 and 611, respectively. Additionally, in FIGS. 1, 3 and 5 upper layer 100 includes upper layer protocol API (ULP API) 101 and lower layer protocol API (LLP API) 201 with FIG. 5 illustrating the inclusion of API 200 which is shown in two portions 201a and 201b to illustrate the fact that the thread portion involving callback processing does not pass through this interface. Likewise, FIGS. 2, 4 and 6 include upper level protocol (ULP) callback interface 103 and lower level protocol (LLP) call back interface 203 with FIG. 6 illustrating the inclusion of two such structures, 103a and 103b. In the context of protocol layering, the syntax and semantics of a callback function are defined by the LLP but the function itself is provided by the ULP and called by the LLP. For comparison, the syntax and semantics of an API function are defined by the LLP and the function is provided by the LLP and called by the ULP. FIGS. 1, 3 and 5 also illustrate the placement of upper layer protocol API (ULP API) 101 and lower level protocol API (LLP API) 201. FIGS. 2, 4 and 6 illustrate the placement of upper layer protocol (ULP), callback interface 103 and lower level protocol (LLP) callback interface 203 with FIG. 6 illustrating the fact that ULP callback interface 103 is shown in two portions, 103a and 103b, to emphasize the fact that thread processing between blocks 613 and 617 does not pass through callback interface 103.

FIG. 1 illustrates a locking process in which a call from a user is processed through ULP API 101 in which the first step in the processing thread is the acquisition of a lock for the upper level protocol (block 111). Once this safety feature is in place any necessary processing takes place (block 112). In block 112, the label "preprocessing" refers to any data processing activity carried out in upper layer 100 prior to access directed to lower layer 200. However, prior to accessing lower layer 200 through LLP API 201, the thread releases (in block 113) the lock previously acquired (in block 111); this is a common practice to avoid deadlock situations when multiple locks in different layers are used for access control. To protect that access during its processing (as carried out in block 115) the thread acquires an LLP lock in block 114 in layer 200. When the processing is finished the LLP lock is released (block 116) and the thread continues by returning to upper layer 100 through LLP API 201. Again, another ULP lock is acquired in block 117 and whatever needed or desired ULP processing occurs in block 118. As above, the label "postprocessing" refers to any processing carried out in upper layer 100 subsequent to any processing carried out in lower layer 200. When the processing of block 118 is finished, the most recently acquired lock (block 117) is released in block 119 prior to a return to the user through ULP API 101. Note that the processing of this thread in this manner across at least one protocol layer requires six locking operations. This is the conventional approach to lock management and it suffers from the problems of inefficiency indicated above. Solutions to these problems are addressed in FIGS. 3 through 6.

However, before proceeding on to a discussion of the specific solutions provided herein, it is useful to examine a somewhat different situation which also involves a thread which extends across a protocol layer. In this regard, attention is directed to FIG. 2. In this scenario, representing a notification-sleep data processing sequence, the thread begins with notification provided to lower level 200 through LLP callback layer 203. As with the processing shown in FIG. 1, the first thing that is done is the acquisition of a LLP lock (block 211). Whatever necessary or desired preprocessing for lower layer 200 is carried out in block 212. The next step in the thread shown is the release of the acquired LLP lock. This release is shown in block 213, but it is noted that this release is optional. It is optional because there is no deadlock if the LLP lock is not released. Deadlocks happen when both the ULP and the LLP don't release their lock when control is transfer into the other layer. It is possible that the user is making a call to one ULP API function and at the same time there is a notification to the LLP which invokes a LLP callback. In such a situation, the ULP function acquires an ULP lock and calls one LLP function without releasing ULP lock while the LLP callback acquires LLP lock and calls one ULP callback without releasing LLP lock. Then both layers end up holding one lock and requesting another, resulting in a deadlock. When FIGS. 1 and 2 are considered together, it's also possible to have blocks 113 and 117 optional while blocks 213 and 217 are mandatory. In any event the thread continues in a transfer of processing to upper layer 100 through ULP callback layer 103. Again a lock is acquired, namely, an ULP lock in block 214. And, again, whatever needed or desired processing in upper layer 100 is carried out in block 215 after which the ULP lock is released. Processing of the thread continues in lower level 200 after access through ULP callback layer 103. If the LLP lock was released in block 213, then it is reacquired in (correspondingly optional) block 217. Any needed or desired postprocessing is then carried out in block 218 following which the LLP lock is released prior to a return to a sleep status through LLP callback layer 203. As above the processing of the thread in FIG. 2 employs at least four and up to six locking operations. Note too that there is a distinction between LLP locks and ULP locks. They are different. They are processed separately at different times and the fact that there are two locks operative at some times means that there is at least a modicum of additional storage employed. However, the storage penalty is significantly less serious than the time penalty imposed by employing the process structure shown in FIGS. 1 and 2.

Attention is now directed to a locking mechanism which avoids the deficiencies indicated above. In particular, the present invention employs a shared lock structure in which a lock is visible to more than one layer at a time. The data structure of the lock of the present invention includes an additional field which includes a counter which indicates a current level of lock ownership. This provides an indication of lock status. In typical implementations, the counter is incremented at each time a new lock is normally acquired and decremented at each point in time that a lock is normally released. It should be understood that any uniformly applied monotonically increasing or decreasing function could also serve a mechanism for setting a counter. The increments do not necessarily have to be by "ones" or even be numeric in nature as long as comparisons can be made and as long as it can be determined that the counter has returned to an initial state. Typically, and preferably, this state is a numeric "zero." Naturally the data structure of a lock includes an indication of the controlling thread.

It should be noted that the present invention is not the same as recursive locking which in fact constitutes a distinct locking mechanism. While the present invention employs recursive locks, it is noted that such locks are not new. Recursive locking is a variant of locking in which a thread re-acquires an already acquired lock without introducing a deadlock. For a regular lock, whenever it is acquired, it enters a busy state and, until it is freed, it cannot be acquired by any thread including the one that is currently holding it.

With this in mind attention is directed to the thread processing shown in FIG. 3. In this case, a call from a user to upper layer 100 through ULP API 101 is immediately followed by the acquisition of a shared lock, such as that described above, in block 311. Note that this is a shared lock and the designation of ULP lock or LLP lock is no longer appropriate. It is noted that following ULP preprocessing in block 312, the shared lock may optionally be released (see block 313), but this is not the typically preferred scenario. The thread is then continued to lower layer 200 where the shared lock is required in a recursive fashion as shown in block 314. The recursion level indicator is controlled using any of the mechanisms for counting and tracking as discussed above. When a lock is already held by a requesting thread, it is noted that recursive acquisition of a lock does not entail any significant overhead in terms of processing time or resource utilization, as is the case for block 314 in FIG. 3. This is the process step which provides many of the advantages of the present invention. The thread then continues by carrying out any needed or desired processing in lower layer 200 (see block 315). At this point, the recursively acquired lock is recursively released (block 316) using the any convenient counting scheme. The thread then continues via LLP API 201 to return to upper layer 100. Corresponding to whether or not the option for lock release was carried out in block 313, the shared lock is optionally acquired in block 317 before ULP postprocessing in block 318. Following this, the shared lock is released in block 319 prior to returning to the user through ULP API 101. Note that this is not a "recursive release" such as was done in block 316. It is also noted that both block 311 and block 319 can be recursive counterparts. If there are only two layered protocols, the recursive acquisition and release in blocks 311 and 319 results in the actual acquisition and release of the shared lock. It is more obvious that they can be recursive when yet another protocol layer occurs above the one ULP layer shown and when it shares the same lock. Note too that here, the typical process thread employs essentially only two locking operations with any significant overhead, namely blocks 311 and 319.

The present invention may also be practiced according to the embodiment shown in FIG. 4. FIG. 4 is similar to FIG. 2 but employs the concept of a shared lock. For example, in block 411 a shared lock is acquired as opposed to the LLP lock shown in block 211 in FIG. 2. Likewise, it is optional to perform a lock release operation in blocks 213 and 413. The benefits of the present invention, however, start to pay off in the recursive acquisition of a lock as shown in block 414. Using the lock data structure described above permits this lock to be provided with a counter which is preferably incremented at this point (that is, in block 414). For example, at those times when a counter is greater than zero, lock acquisition and release is handled recursively without the need for the normal overhead in time and resources associated with lock handling. The acquisition of a lock in block 414 consumes significantly less time and resources than the corresponding acquisition seen in block 214 of FIG. 2. At this point any necessary or desired processing is carried out in upper level 100, as shown in block 415. Following this processing, the lock is released (block 416) in the recursive manner described, preferably through decrementing by one a counter associated with the lock. Again this is a process step which provides advantages not provided in the corresponding step (block 216) shown in FIG. 2. At this point control is returned to lower level 200 through ULP callback layer 103. At this point, if the shared locked had been released in block 413, it is reacquired in block 417. With blocks 413 and 417 present, they do result in the release and acquisition of the shared lock. It is proper for these blocks to be present, but less efficient. Blocks 413 and 417 are optional because their presence still results in correct locking, although less efficiently. Their absence is preferred for efficient locking, as illustrated by FIGS. 5 and 6.

Attention is now directed to the process flow show in FIG. 5. FIG. 5 is similar to FIG. 3 except that it is complicated by a callback from lower level 200 to upper level 100 through ULP callback layer 103. The process shown is the typical "user call" to "return to user" sequence. A call from a user program via ULP API 101 initiates the acquisition of a shared lock (block 511). Necessary or desired processing is carried out in block 512 after which control passes to lower level 200 through LLP API 201a after which recursive lock acquisition occurs (block 513). As above, any desired or necessary processing occurs in block 514 following which the present invention allows a "lock free" transition back to control in upper level 100 through ULP callback layer 103. It is a condition of "lock free" transition that the LLP guarantee that the shared lock is already acquired before a callback into the ULP. However, this represents only one embodiment of the present invention. Needed or desired processing occurs in block 515, after which control passes back to lower level 200, again through the same callback interface 103. A second round of lower level processing is provided in block 516. Note that the transition back to upper layer 100 from lower layer 200 (as seen in blocks 514, 515 and 516) does not require the acquisition or release of any locking structures. Subsequent to the processing carried out in block 516 the lock is recursively released (block 517) and control is passed back to upper level 100 through LLP API 201b, as shown. Whatever subsequent needed or desired processing is carried out in block 518 prior to the recursive release of the lock in block 519. As with the methods of shared lock control described above, the preferred method of block 517 employs decrementing a counter. When that counter reaches zero, the system is permitted to release the lock permanently. It is only at these steps (typically and preferably when a counter is zero) that the usual overhead of lock acquisition and release occurs. Once the recursive lock is released (in block 519) control is returned to the user via ULP API 101.

Attention is now directed to FIG. 6 which is best thought of as illustrating a combination of the concepts shown in FIGS. 4 and 5. The essential difference between FIGS. 5 and 6 is that in FIG. 6 thread initiation occurs from lower layer 200 as opposed to upper layer 100. Likewise, control is returned at the end of the thread to lower level 200. This is also the essential difference between FIGS. 1 and 2, between FIGS. 3 and 4 and also between FIGS. 5 and 6, respectively. Likewise FIGS. 5 and 6 are similar in that they both include a thread which passes back, in an intermediate fashion, to the layer from which it began and includes a return to the other layer. In both FIGS. 5 and 6, a shared lock is present and is in effect when the thread returns to the layer in which it began. However, in FIG. 6 the thread (blocks 611, 612, 613, 614, 615, 616, 617, 618 and 619) does all of its lock handling in one layer, namely here, lower layer 200. The thread initially passes from layer 200 to layer 100 via ULP callback layer 103a. The thread returns to lower level 200 via LLP API 201 at which time it recursively acquires a shared lock (block 614), performs processing (as needed or desired) in block 615 and recursively releases the shared lock in block 616 following which the control returns to upper layer 100, again through LLP API 201. After ULP callback processing (block 617) control is again returned to lower level 200 via ULP API callback layer 103b. Any necessary or desired processing is carried out in LLP callback processing block 618 following which the shared lock is recursively released (block 619). Finally, the thread ends with the passage to a sleep mode via LLP callback layer 203. As above, it is those steps which employ recursive lock acquisition and release that provide the most significant part of the performance advantages obtained through the use of shared locks. In FIG. 6, these are blocks 614 and 616.

The description of the present invention is now considered from the point of view of the interface provided, of correctness considerations and finally with a discussion of usage.

Interface

In the present invention a set of locking functions is defined in either the upper protocol or in the lower protocol or both and the other layer retrieves the functions for its use. Theoretically, the set of locking functions can be defined anywhere as long as it is visible to the layers. From the point of view of having a better design, the preferred place is in the LLP because the protocol stack is usually built from the bottom up. If there are multiple sets of locking functions, the protocols using one shared lock first negotiate which set to use. The functions may include the following but are not limited to the list set forth below. Note that in providing this list, the intent is to further describe how one lock is shared between multiple layers. The lock itself is an object but the layers only care about the operations provided on the object and access the object via lock operations. The semantics of the following functions are from the commonly available pthread library which provides generic locking capabilities. It is a further point here that access to the shared lock is via locking functions and that these functions are made visible by an interface.

mutex_lock: to acquire a shared lock; it waits inside the function if the shared lock is held by another thread;

mutex_unlock: to release a shared lock;

mutex_trylock: to acquire a shared lock; it does not wait and it returns control to the caller if the shared lock is held by another thread;

mutex_getowner: to retrieve the current owner of a shared lock;

cond_init: to initialize a condition variable, which is associated with a shared lock (a condition variable is used for thread synchronization: one thread waits on a condition variable for some event and when that event occurs, some other thread signals the condition variable to wake up the waiting thread.);

cond_destroy: to destroy a condition variable;

cond_wait: to wait on a condition variable to be signaled;

cond_timedwait: to wait on a condition variable to be signaled, allowing time-out; and cond_signal: to signal a condition variable and wake up the thread(s) waiting on it, if any.

In the figures herein, "mutex_lock/trylock" is typically used for acquiring the shared lock, "mutex_unlock" for releasing it, and "mutex_getowner" for testing whether the current thread is already holding the lock.

The protocol that defines a shared lock initializes it. The implementation of the shared lock is not exposed and only operations on the shared lock are exposed. This structure permits clean layering. It is not necessary to expose (to make visible) the implementation of the lock. The access to the lock is via locking functions. The layer providing the shared lock easily switches between different lock implementations under different situations as long as all of the implementations follow the syntax and semantics of the locking functions.

Correctness

One major concern of sharing a lock between two protocols is correctness and the preservation of correctness. The traditional way of protecting a critical section (CS) by a lock is to acquire the lock at the entry of the critical section and to release the lock at the exit of the critical section. To avoid confusion, two concepts are clarified in the present discussion. Atomic operation: an operation that must be done atomically. When the steps in an operation on shared data are executed without being interrupted by other operations that operate on the same data, the operation is said to be executed atomically. For example, when a stack is shared by multiple threads, putting an element into the stack and updating the stack top must be performed atomically to maintain the integrity of the stack. Critical section: a sequence of either atomic or non-atomic operations which are protected by a lock.

It is pointed out that atomic operations are the operations for which protection is being sought in the invention herein. Nonetheless, it is still possible to group a sequence of atomic and/or non-atomic operations in a critical section for locking efficiency. If a critical section consists of multiple atomic operations, it is correct to break the sequence into multiple critical sections so that each atomic operation lays entirely in one of the smaller critical sections. For example, there are two methods for a thread to push two logically independent elements onto the stack correctly, as illustrated in Table I below. These methods are logically independent in the sense that the two stack elements are not assumed to be adjacent.

TABLE I

| Method I | Method II |
| --- | --- |
| lock (stack) | lock (stack) |
| push (stack, element 1) | push (stack, element 1) |
| push (stack, element 2) | unlock (stack) |
| unlock (stack) | lock (stack) |
|  | push (stack, element 2) |
|  | unlock (stack) |

The first method is more efficient but it doesn't mean that the two pushes must be done together in one critical section and it's absolutely correct for the second method to release the lock after the first push and reacquire the lock before the second push.

The same analogy can be applied to the meaning of critical section under lock sharing and we place a requirement for effective lock sharing. That is, even if one protocol can create a large critical section protected by a shared lock, it can still structure itself in a way that any of its atomic operations complete before the control is transferred to the other protocol. This mode of operation is reasonable and useful because, when control is transferred from one protocol to the other, the second protocol can generate callbacks into the first protocol layer. If there is any incomplete atomic operation left before the control transfer, the first protocol is thus very careful not to break the atomicity of the incomplete operation in the callbacks. Such programming is error-prone and should not be practiced anyway. This structure is the same as having the protocols function correctly when the shared lock is always released before control is transferred from one protocol to the other and reacquired when the control returns. It allows both protocols to easily switch from using the shared lock to using separate locks. When the control is in one protocol, that protocol can safely flash the shared lock to allow processing in a different thread and callbacks into the other protocol from that thread. (To flash a lock is to release the lock and re-acquire it later. Once the lock is released, it can be acquired later by a different thread.)

Usage

The general usage of the shared lock is illustrated in the following calling sequences.

Down-Call
The upper protocol:
1. Acquire the shared lock
2. Request/Event/Data preprocessing
3. (The shared lock is still being held but doesn't hurt if released)
4. Call to the lower protocol's API
The lower protocol:
4.1 (Acquire the shared lock if not already acquired)
4.2 Request/Event/Data processing
4.3 (Release the shared lock if acquired in 4.1)
4.4 Return to the upper protocol
The upper protocol:
5. (Reacquire the shared lock only if released in 3.)
6. Request/Event/Data postprocessing
7. Release the shared lock
8. Return to the user
Up-Call:
The lower protocol:
1. Acquire the shared lock
2. Event preprocessing
3. (The shared lock is still being held but doesn't hurt if released)
4. Callback to the upper protocol
The upper protocol:
4.1. (Acquire the shared lock if not already acquired)
4.2. Event processing
4.3. (Release the shared lock if acquired in 4.1)
4.4. Return to the lower protocol
The lower protocol:
5. (Reacquire the shared lock only if released in 3.)
6. Event postprocessing
7. Release the shared lock
8. End of event handling The steps in parentheses are the places of saving. In general, the two protocols can behave as one combined protocol in terms of locking and there is only one lock acquisition at the entry of the combined protocol and one lock release at the exit. Even though the two protocols behaves as one, one protocol need not make presumptions about the characteristics of the other protocol as long as the other protocol honors the lock sharing policies.

Generalization

It is also to be noted that the present invention is applicable in the scenario where there are more than two layered protocols.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for controlling a thread performing at least one atomic operation in a data processing system, wherein the thread extends across at least two protocol layers for processing at least one event in each protocol layer, said method comprising the steps of:

initializing, by one of said at least two protocol layers, a lock with an associated at least one locking function defined in a first layer of said at least two protocol layers, wherein said at least one locking function of said lock is visible by an interface to said at least two protocol layers without making the implementation of the lock visible;

responsive to said thread called from a user, acquiring said lock, by said thread, by calling said at least one locking function from within said first layer;

preprocessing said at least one event by said thread within said first layer;

calling, by said thread, a second layer of said at least two protocol layers;

determining, by said thread from within said second layer, whether a status for said lock is already acquired by said thread by calling said at least one locking function;

responsive to said status indicating said lock is already acquired by said thread, recursively acquiring said lock by said thread by incrementing a counter associated with said lock, processing said at least one event by said thread within said second layer including a temporary return of said thread to said first protocol layer, recursively releasing said lock by said thread by decrementing said counter, and returning to said first layer;

postprocessing said at least one event by said thread within said first layer; and releasing said lock, by said thread, by calling a release function of said locking functions from within said first layer and returning to said user.

2. The method of claim 1 in which said status is determined in a first one of said at least two protocol layers.

3. The method of claim 1 which further includes steps of releasing said lock in a recursive manner prior to transition to another protocol layer and reacquiring said lock in a recursive manner upon return to said protocol layer.

4. The method of claim 1 in which said thread extends from an upper layer to a lower layer of the at least two protocol layers.

5. The method of claim 1 in which said thread extends from a lower layer to an upper layer of the at least two protocol layers.

6. The method of claim 1 in which said thread is initiated by said user and returns to said user.

7. The method of claim 1 in which said thread is initiated by notification and returns to a sleep mode.

8. The method of claim 1, wherein responsive to said status indicating said lock is already acquired by said thread, recursively acquiring said lock by said thread by incrementing a counter associated with said lock, processing by said thread within said second layer, recursively releasing said lock by said thread by decrementing said counter, and returning to said first layer further comprises:
   responsive to processing by said thread within said second layer, returning control of said thread to said first layer;
   recursively acquiring said lock by said thread in said first layer by incrementing said counter associated with said lock;
   processing by said thread within said first layer; and
   recursively releasing said lock by said thread in said first layer by decrementing said counter and returning to said second layer.

9. A program product comprising:
   storage containing program instructions thereon, usable by a data processing system, for:
   initializing, by one of at least two protocol layers, a lock with an associated at least one locking function defined in a first layer of said at least two protocol layers, wherein said at least one locking function of said lock is visible by an interface to said at least two protocol layers without making the implementation of the lock visible;
   responsive to a thread called from a user, acquiring said lock, by said thread which extends across said at least two protocol layers for processing at least one event in each protocol layer, by calling said at least one locking function from within said first layer;
   preprocessing said at least one event by said thread within said first layer;
   calling, by said thread, a second layer of said at least two protocol layers;
   determining, by said thread from within said second layer, whether a status for said lock is already acquired by said thread by calling said at least one locking function;
   responsive to said status indicating said lock is already acquired by said thread, recursively acquiring said lock by said thread by incrementing a counter associated with said lock, processing said at least one event by said thread within said second layer including a temporary return of said thread to said first protocol layer, recursively releasing said lock by said thread by decrementing said counter, and returning to said first layer;
   postprocessing said at least one event by said thread within said first layer; and
   releasing said lock, by said thread, by calling a release function of said locking functions from within said first layer and returning to said user.

* * * * *